United States Patent
Beki et al.

(10) Patent No.: US 8,033,573 B2
(45) Date of Patent: Oct. 11, 2011

(54) ROLLOVER PROTECTION SYSTEM WITH IMPROVED SUPPORTING DEVICE

(75) Inventors: Gürkan Beki, Engelskirchen (DE);
Stephan Berges, Gummersbach (DE);
Michael Nass, Bergneustadt (DE);
Dietmar Wacker, Drolshagen (DE);
Jörg Benz, Numbrecht-Oberbierenbach (DE)

(73) Assignee: Ise Automotive GmbH, Bergneustadt (DE)

( * ) Notice: Subject to any disclaimer, the term of this patent is extended or adjusted under 35 U.S.C. 154(b) by 0 days.

(21) Appl. No.: 12/589,954

(22) Filed: Oct. 30, 2009

(65) Prior Publication Data

US 2010/0109307 A1    May 6, 2010

(30) Foreign Application Priority Data

Nov. 4, 2008 (DE) .......................... 10 2008 043 443

(51) Int. Cl.
*B60R 21/13* (2006.01)
(52) U.S. Cl. ..................................... 280/756; 180/69.21
(58) Field of Classification Search .................. 280/756; 296/68.1; 180/69.21, 274
See application file for complete search history.

(56) References Cited

U.S. PATENT DOCUMENTS

| | | | | |
|---|---|---|---|---|
| 4,840,398 A | * | 6/1989 | Matthias et al. | 280/756 |
| 6,352,285 B1 | * | 3/2002 | Schulte et al. | 280/756 |
| 6,364,402 B1 | * | 4/2002 | Sasaki | 296/187.09 |
| 7,540,535 B2 | * | 6/2009 | Kasubke | 280/756 |
| 7,543,878 B2 | * | 6/2009 | Lang | 296/68.1 |
| 7,654,569 B2 | * | 2/2010 | Nelson | 280/756 |

FOREIGN PATENT DOCUMENTS

DE  10 2005 028 928 A1   12/2006
WO  WO 2006/137745 A1   12/2006

* cited by examiner

*Primary Examiner* — Eric Culbreth
(74) *Attorney, Agent, or Firm* — Hudak, Shunk & Farine Co. LPA

(57) ABSTRACT

A rollover protection system for motor vehicles with a roll bar, which can be moved by a drive unit from a position of rest to a protection position, is secured in the protection position by a locking device and prevented from retracting, and is fixed in the position of rest by a holding device, wherein the holding device has a movably arranged catch element which can be disengaged abruptly by a pyrotechnic actuator. For such cases in which the catch element can move beyond the release point and there is a danger of a rebounding, because a path-limiting stop is present, a structural part is provided that prevents a return movement of the catch element into the holding position.

10 Claims, 14 Drawing Sheets

ROLLOVER PROTECTION SYSTEM WITH IMPROVED SUPPORTING DEVICE

FIELD OF THE INVENTION

The invention concerns a rollover protection system for motor vehicles with a roll bar, which can be moved by a drive unit from a position of rest to a protection position, is secured in the protection position by a locking device and prevented from retracting, and is fixed in the position of rest by a supporting and/or holding device, the holding device having a movably arranged catch element which can be disengaged abruptly by a pyrotechnical actuator.

BACKGROUND OF THE INVENTION

Such safety systems are used to outfit motor vehicles not having any roof structure—like convertibles—or whose roof structure does not afford sufficient protection to the passengers in event of a rollover. Dynamic systems with a roll bar which can be moved from a position of rest to a protection position are used when rigid roll bars are not desired due to visual appearance.

As with the activation of air bags, pyrotechnical actuators are used to release the holding device: after a "rollover signal" has been generated by means of appropriate sensors, they are electronically actuated and ignited to produce a mechanical adjustment movement. Pyrotechnical actuators are preferable for use, because with them the "rollover signal" can be very quickly converted into a triggering adjustment movement so that the roll bar can be brought into the protection position swiftly before the rollover is completed.

The igniting of the pyrotechnical actuator results in the catch element of the holding device being abruptly disengaged, releasing the driving force for the movement of the roll bar.

However, it has been found that rebound effects may occur after the abrupt acceleration of the catch element, because the distance available to the catch element after the point of release is limited. The limitation can be desirable for design reasons, or necessitated by the installation process.

The accelerated catch element can then bounce back toward its starting position and again produce a catching effect before the roll bar with its much greater inertia than that of the catch element is sufficiently accelerated and has moved far enough toward the protection position so that the catch element can no longer become engaged. The reaction times between generation of the "rollover signal" and the movement of the roll bar at least to a position no longer catchable are in the range of 15 ms.

Furthermore, one must consider that unforeseeable acceleration forces will act on all elements of the system during a rollover and may substantially alter the time course of the process—as compared to what was found during testing.

Hence, the problem is to avoid a rebounding of the catch element that is abruptly accelerated to release the holding device after it impacts against a structural element bordering on its exit path.

SUMMARY OF THE INVENTION

To solve this problem, the invention proposes that the catch element can move beyond the release point and a structural part is provided that prevents a return movement of the catch element to the holding position.

According to a first embodiment of the notion of the invention, the structural part is a stopping or clamping face arranged at a slant to the direction of movement, which in conjunction with the bearing or guidance system of the moving catch element ensures that the catch element will be braked and thus not even reach the structural element bordering on its exit path or be so greatly slowed down that a harmful rebound effect can no longer occur.

According to a second embodiment of the notion of the invention, it is provided that the travel path of the catch element is limited by a stop and plastically deformable material is arranged either on the stop or on the catch element in the area of the point of impact. In this way, one avoids an elastic impact with rebound effect necessarily resulting due to the material in regard to the mechanical strength. The kinetic energy of the catch element can thus be transformed essentially into plastic deformation, so that a rebounding is entirely avoided or reduced to a harmless degree.

Another embodiment of the notion of the invention provides that the travel path of the catch element is limited by a stop and a detent mechanism that is elastically deformable by the catch element is arranged in the travel path. The detent mechanism can consist of two detent hooks, arranged relative to each other in forklike fashion and able to be spread apart by the catch element in its forward motion, which limit the return movement of the catch element after its rebounding.

Instead of the detent hook, a detent spring can also be provided in the travel path of the catch element, which is displaced from the path of the catch element during its forward movement, but then engages a projection on the catch element and thus prevents a return movement after rebounding.

If the catch element consists of a swivel mounted pawl, moreover, it is possible to arrange a detent mechanism in the region of the swivel mounting, which is elastically deformed during the forward movement of the pawl and prevents a backward movement.

The notion of the invention can also be employed in another safety system for motor vehicles. For this, the front hood or engine hood of the motor vehicle can be moved from the position of rest to a raised position of protection in order to lessen the risk of injury upon impact of a passenger. Here as well, the front or engine hood is held in the position of rest by a pyrotechnically released catch element and after the ignition of the pyrotechnical actuator it is released to move into the position of protection. Naturally, here as well a rebounding of the catch element into its starting position must be prevented.

BRIEF DESCRIPTION OF THE DRAWINGS

Further details and benefits will be explained more closely by means of the sample embodiments shown in FIGS. 1A to 4C. There are shown in the figures, each time in consecutive sequence.

DETAILED DESCRIPTION OF THE INVENTION

All figures are to be considered as schematics, each one showing only a cutout feature of a rollover protection system, which is of significance in the context of the present invention. In all figures, a part of the deployed roll bar is indicated by 1 and the pyrotechnical actuator releasing the holding device by 2. The reference number 7 stands for the structural part of the holding device that interacts with the movable catch element and 14 denotes a structural part of the rollover protection that is fixed to the vehicle, at the same time forming the path-limiting stop for the movable catch element.

Figure 1A:
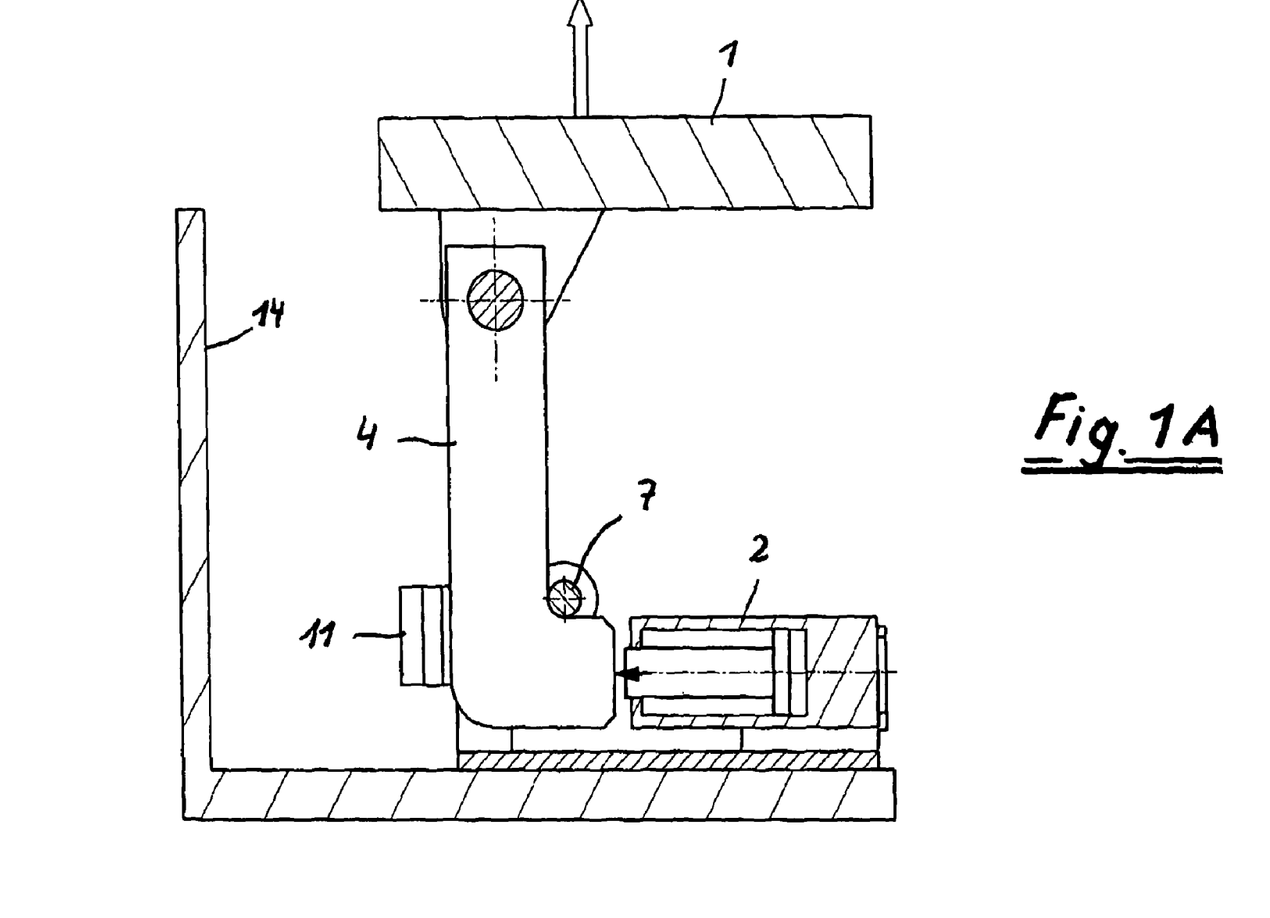
FIGS. 1A-1F a rebound stop by means of spreading detent hook
Figure 1B:
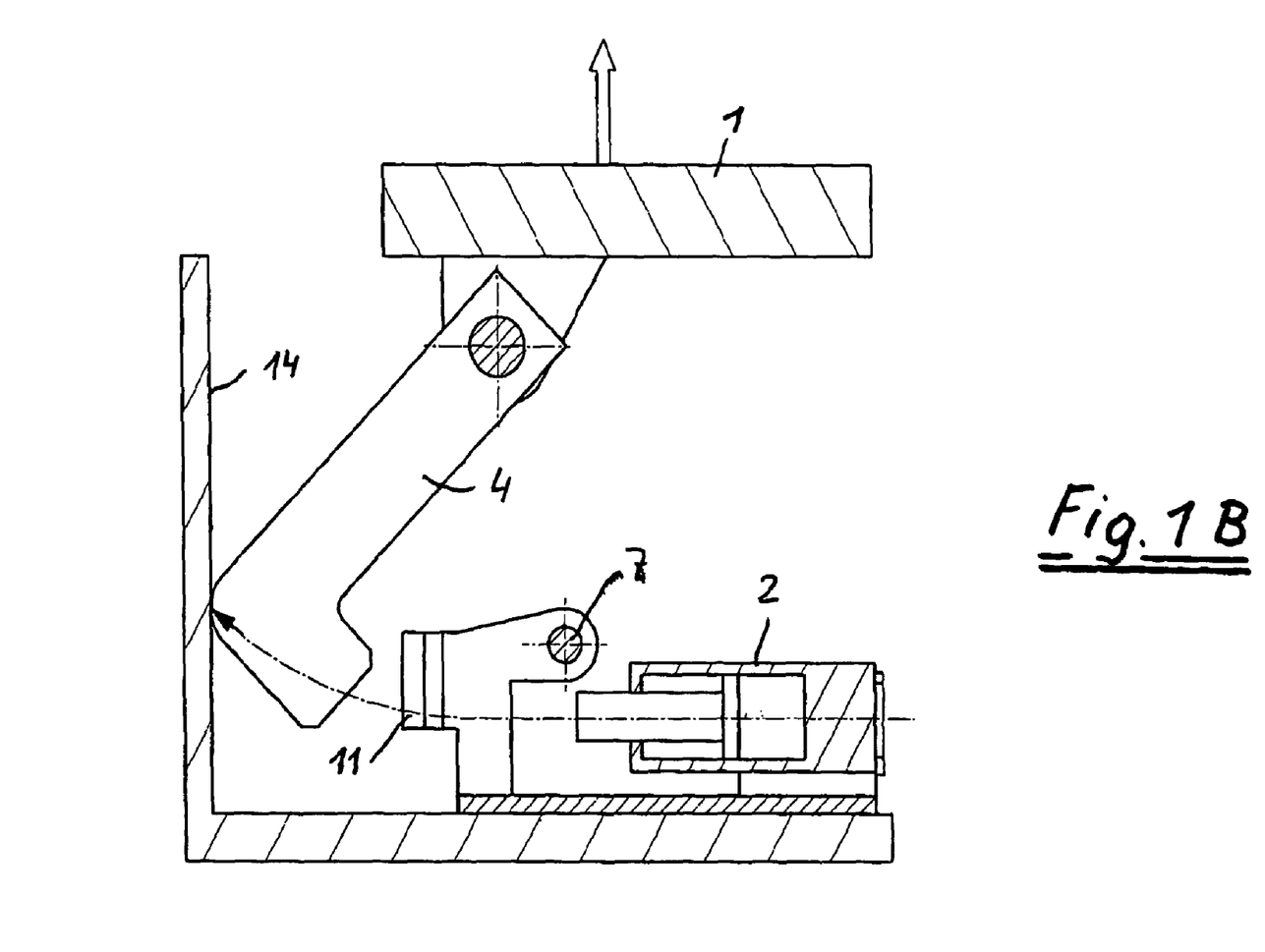
Figure 1C:
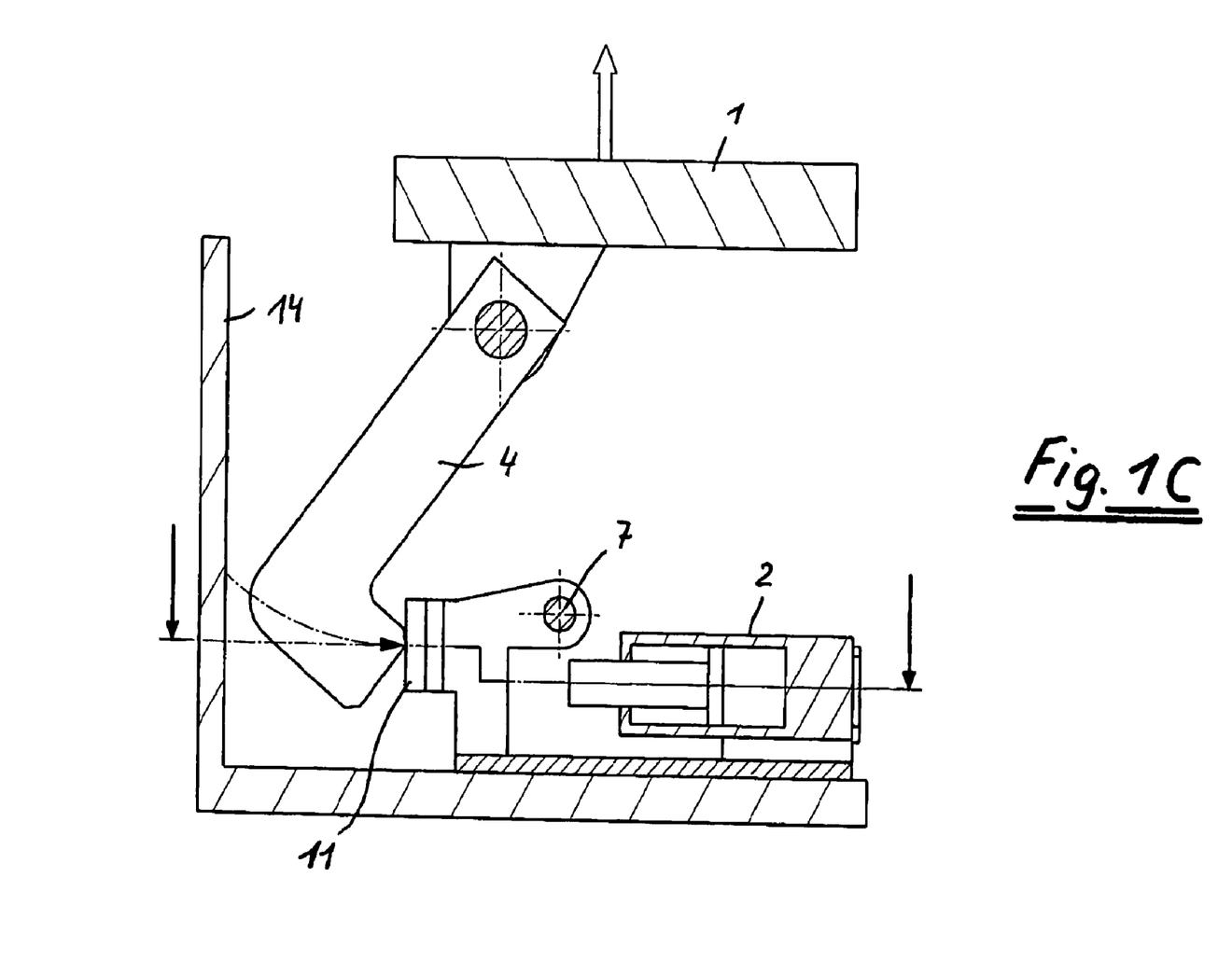
Figure 1D:
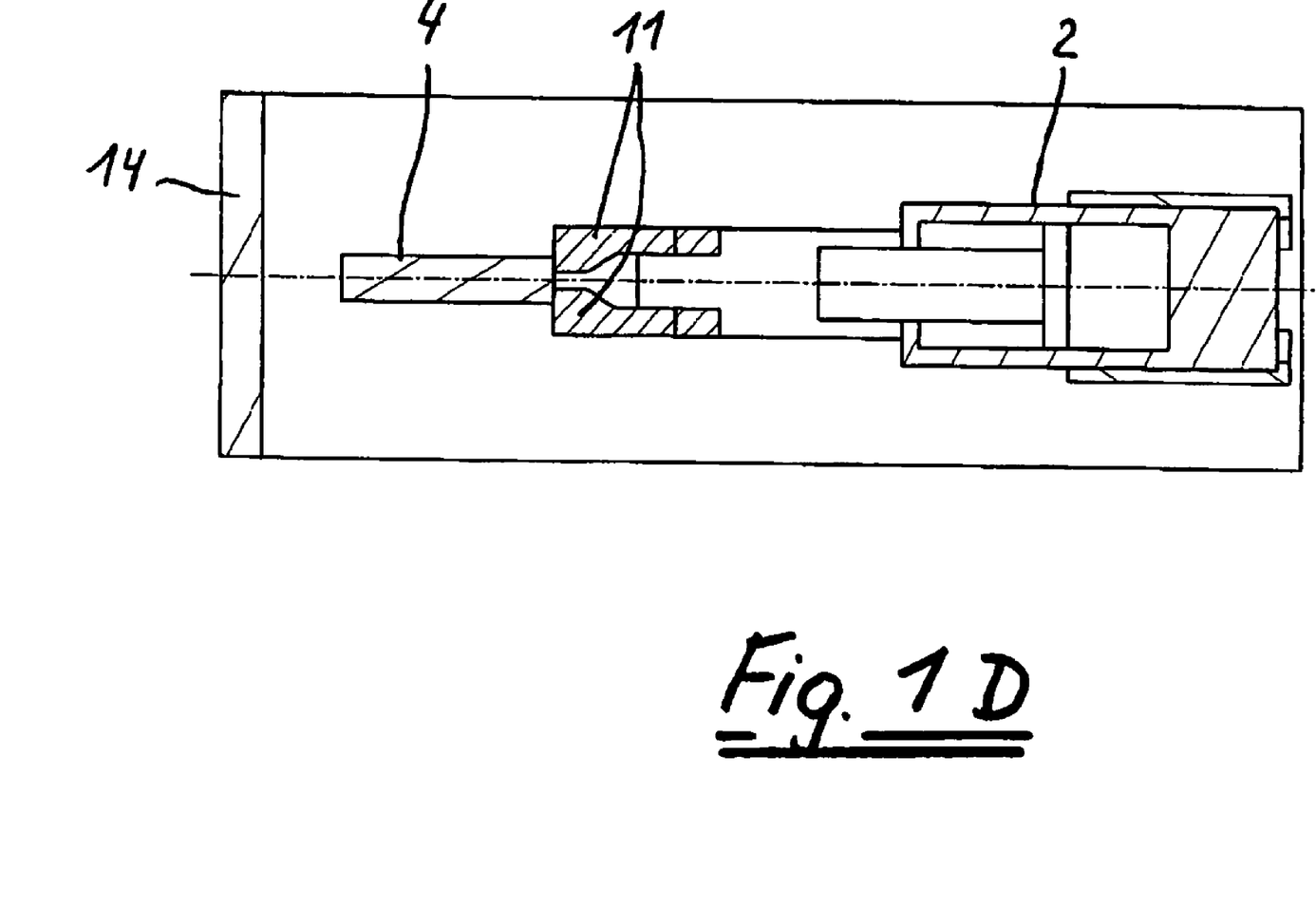
Figure 1E:
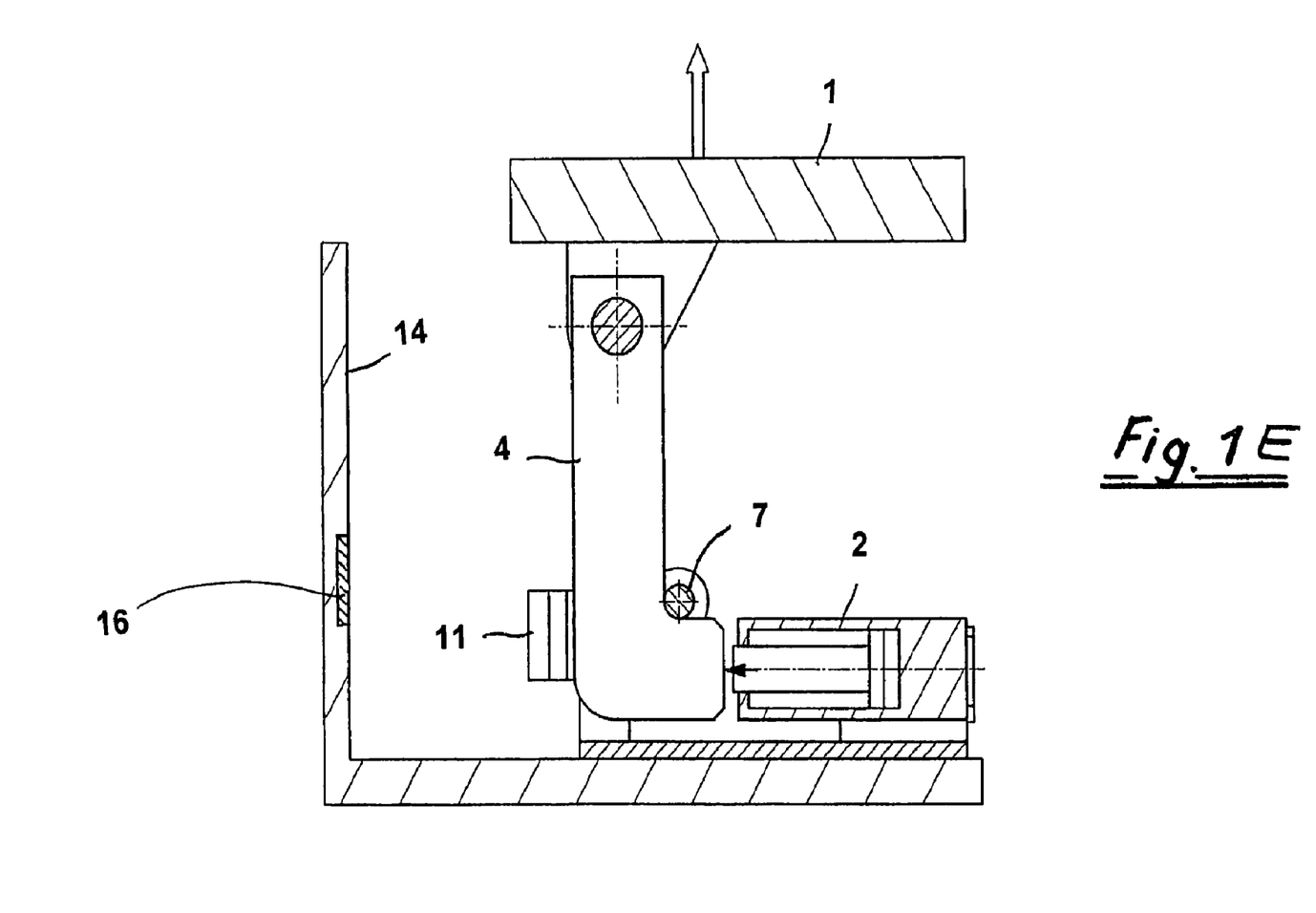
Figure 1F:
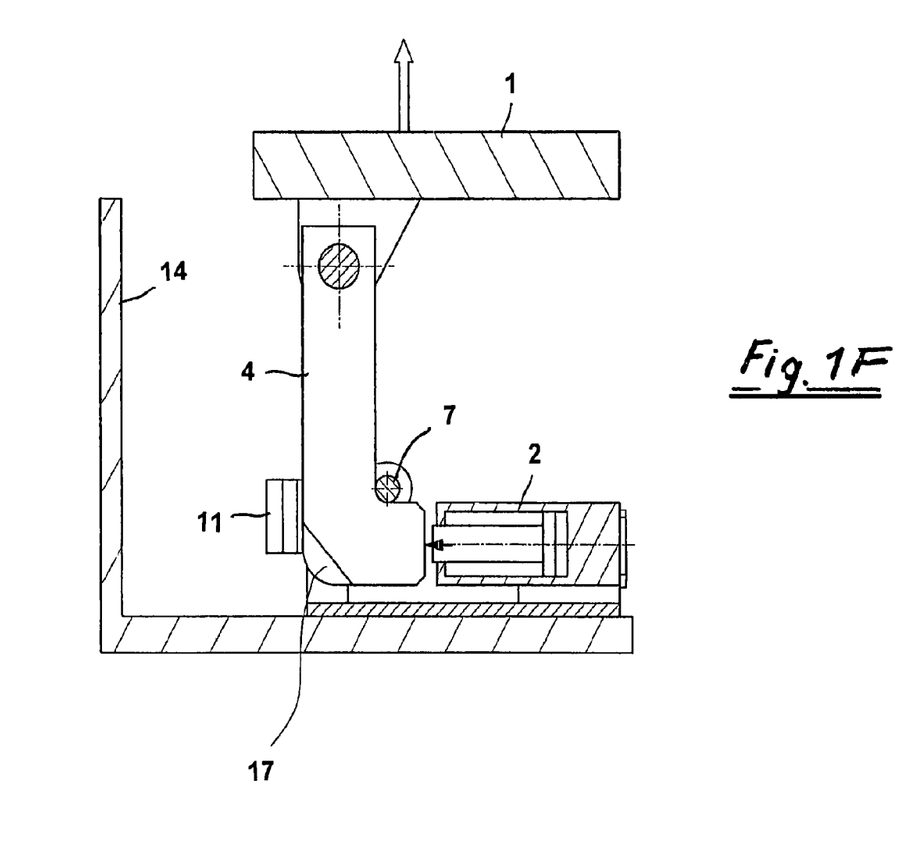

FIG. 1A shows the situation before the releasing of the holding device. The holding device consists of a catch element 4 swivel mounted on the roll bar 1, engaging with a bolt 7 or the like, fixed to the vehicle, and thereby ensuring that the roll body 1 cannot be moved in the direction of the upwardly pointing arrow. On the fixed bolt 7 there is fastened a detent mechanism in the form detent hooks 11 able to be spread apart by the catch element 4, of which only the rear part is shown in FIG. 1A. In the cross sectional view of FIG. 1D, both detent hooks 11 can be seen, having slanting surface sections facing each other, so that the detent element 4 in its movement from right to left can spread the detent hooks 11, which snap back after the catch element 4 has moved through them and thus prevent the return of the catch element to the starting position. It can be seen from FIGS. 1B and 1C how the catch element 4 is first pushed by the pyrotechnical actuator 2 as far as the stop on the vehicle-fixed structural part 14 and then rebounds, the return path being blocked by the detent hooks 11, initially spread apart and then snapping back. A travel path of the catch element is limited by a stop 14 and plastically deformable material 16 is arranged on the stop as illustrated in FIG. 1E. In a schematic representation, plastically deformable material 17 is arranged on the catch element in the area of the point of impact in FIG. 1F.

Figure 2A:
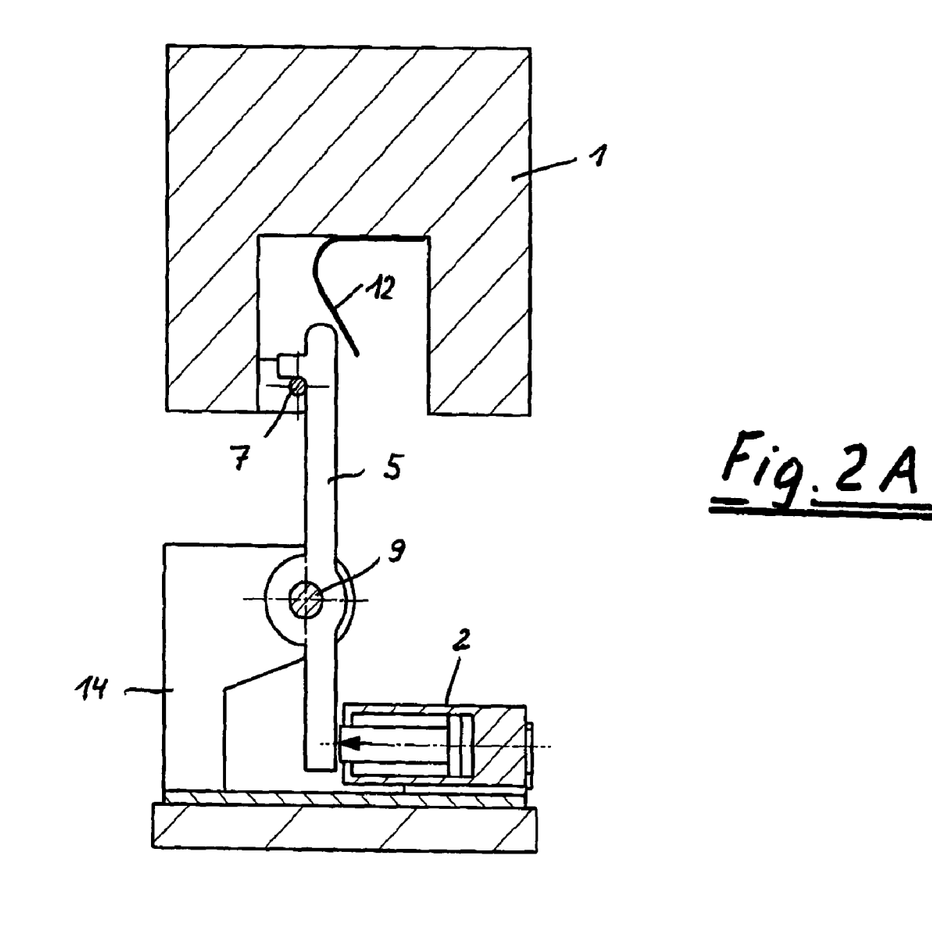
FIGS. 2A-2C a rebound stop by means of detent spring

The sample embodiment of FIG. 2A shows a vehicle-fixed, swivel mounted catch element 5, which interacts with a bolt 7 or the like arranged on the roll bar 1. Contrary to the sample embodiment of FIG. 1A, the catch element 5 thus does not travel outward, but rather is swivel mounted at point 9 in the vehicle-fixed part 14 of the rollover protection system (kinematic reversal).

Figure 2B:
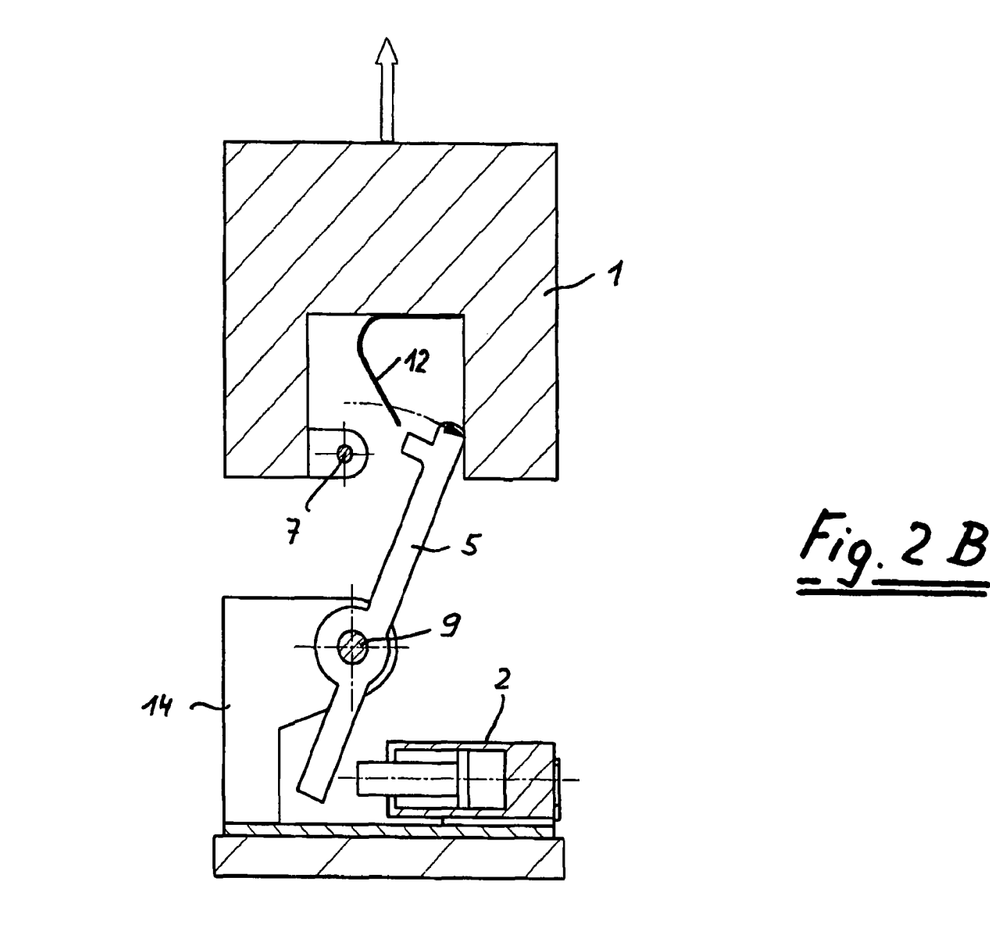
Figure 2C:
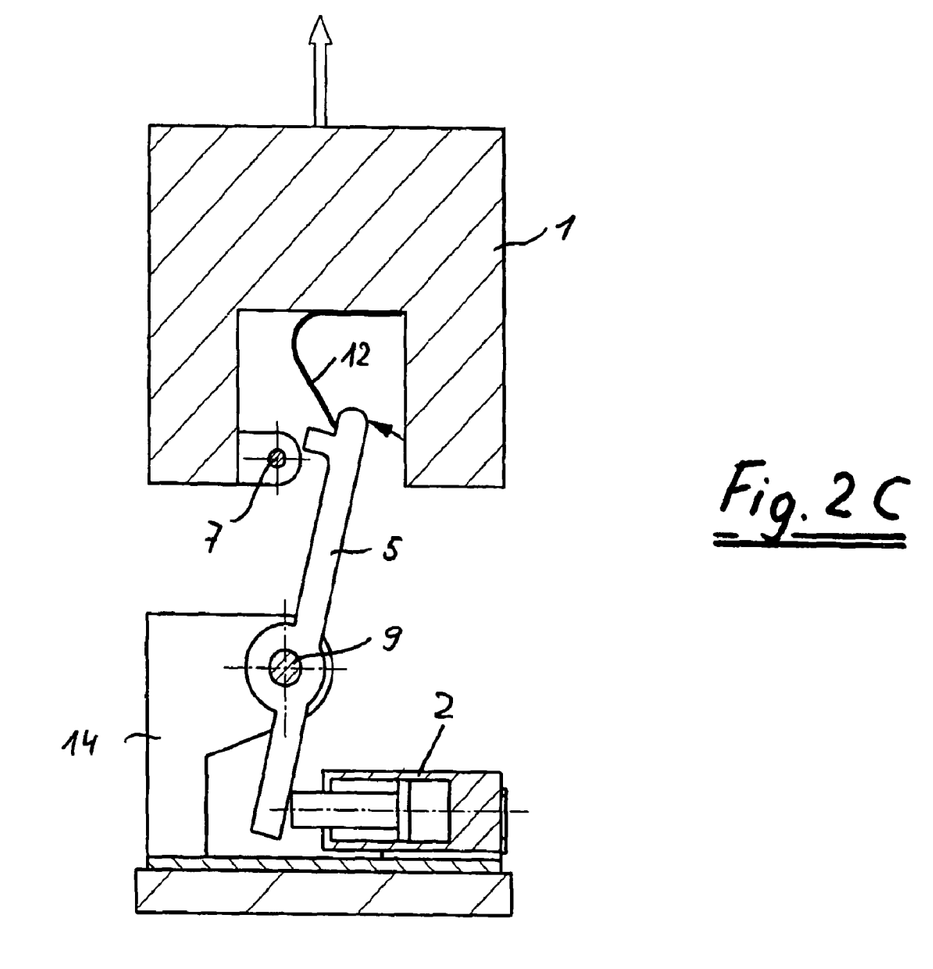

In this case, the swivel path of the catch element 5 also is not limited by a vehicle-fixed structural part, but instead by a wall of the roll bar 1. The representation of FIG. 2A shows the starting position, FIG. 2B the releasing of the holding device by the pyrotechnical actuator 2 and the striking of the catch element 5 against the path-limiting wall of the roll bar 1. During this movement, the detent spring is compressed at both ends, but prevents a return of the catch element 5 to the starting position after impact against the path-limiting wall of the roll bar 1, according to FIG. 2C.

Figure 3A:
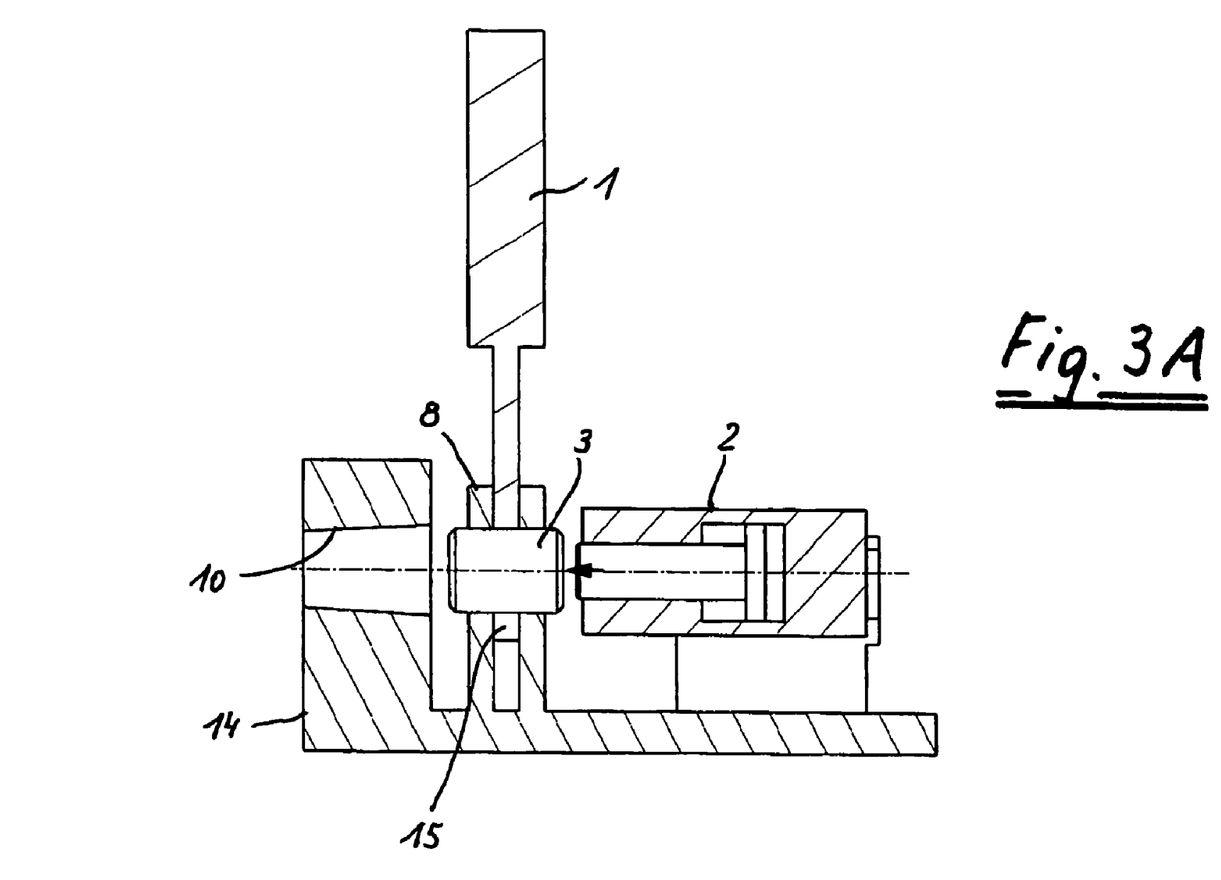
FIGS. 3A-3B a rebound stop by means of a stopping surface
Figure 3B:
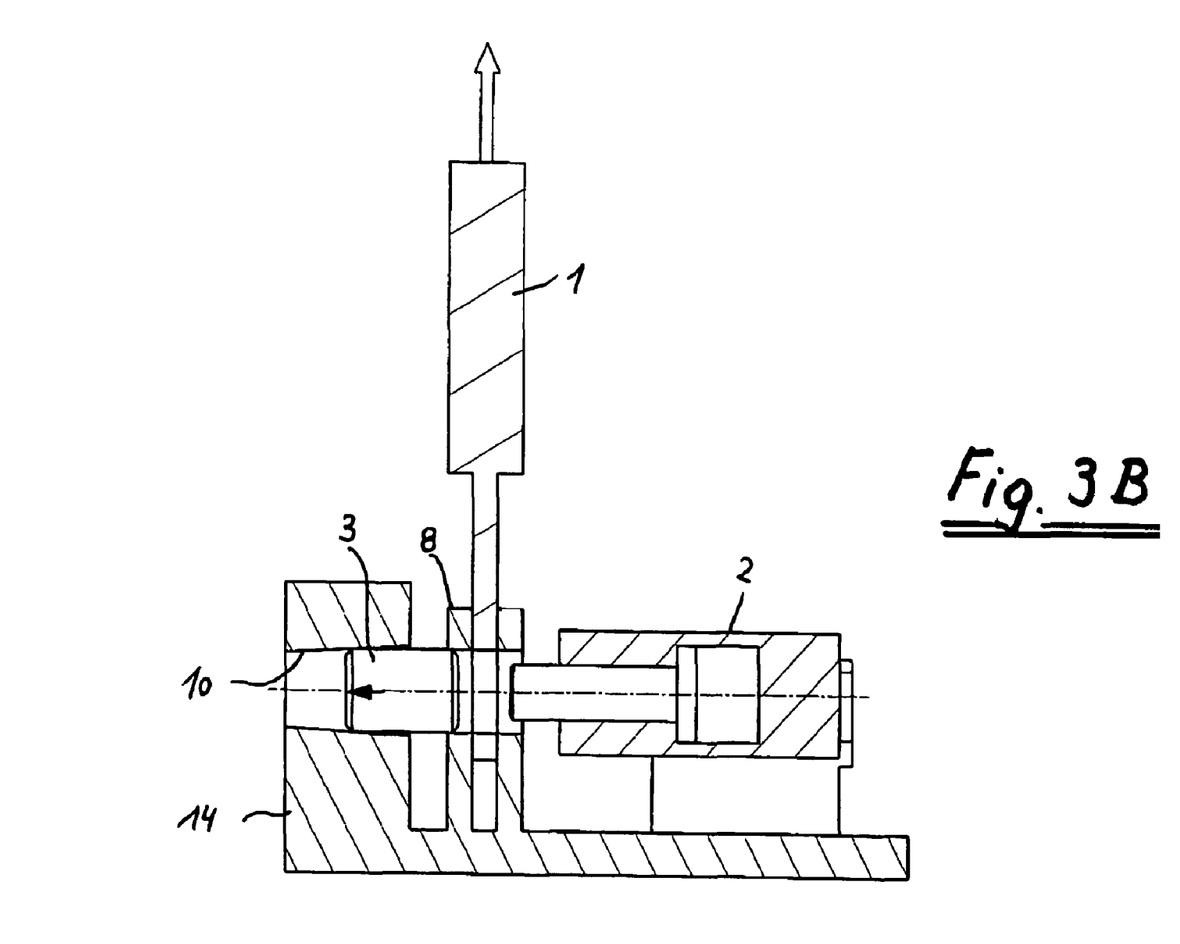

In the sample embodiment of FIG. 3A, a recess or borehole 15 is provided on the extending roll bar 1, which engages with a catch element 3, which is mounted in a vehicle-fixed part 8 of the holding device. Upon igniting of the pyrotechnical actuator, the catch element 3 is moved to the left and slowed down in the conical borehole 10 of the vehicle-fixed structural part 14, see FIG. 3B. This prevents a rebound effect. FIGS. 3A and 3B show that the structural part is a stopping face 10 arranged at a slant to the direction of movement.

Instead of a conical borehole 10, for a swivel mounted catch element one can also provide a stopping surface arranged slanting to the direction of movement at one end, either preventing the catch element from advancing up to a path-limiting stop, or slowing down the abruptly triggered forward motion of the catch element so much that the rebound effect is reduced to a noncritical value.

Figure 4A:
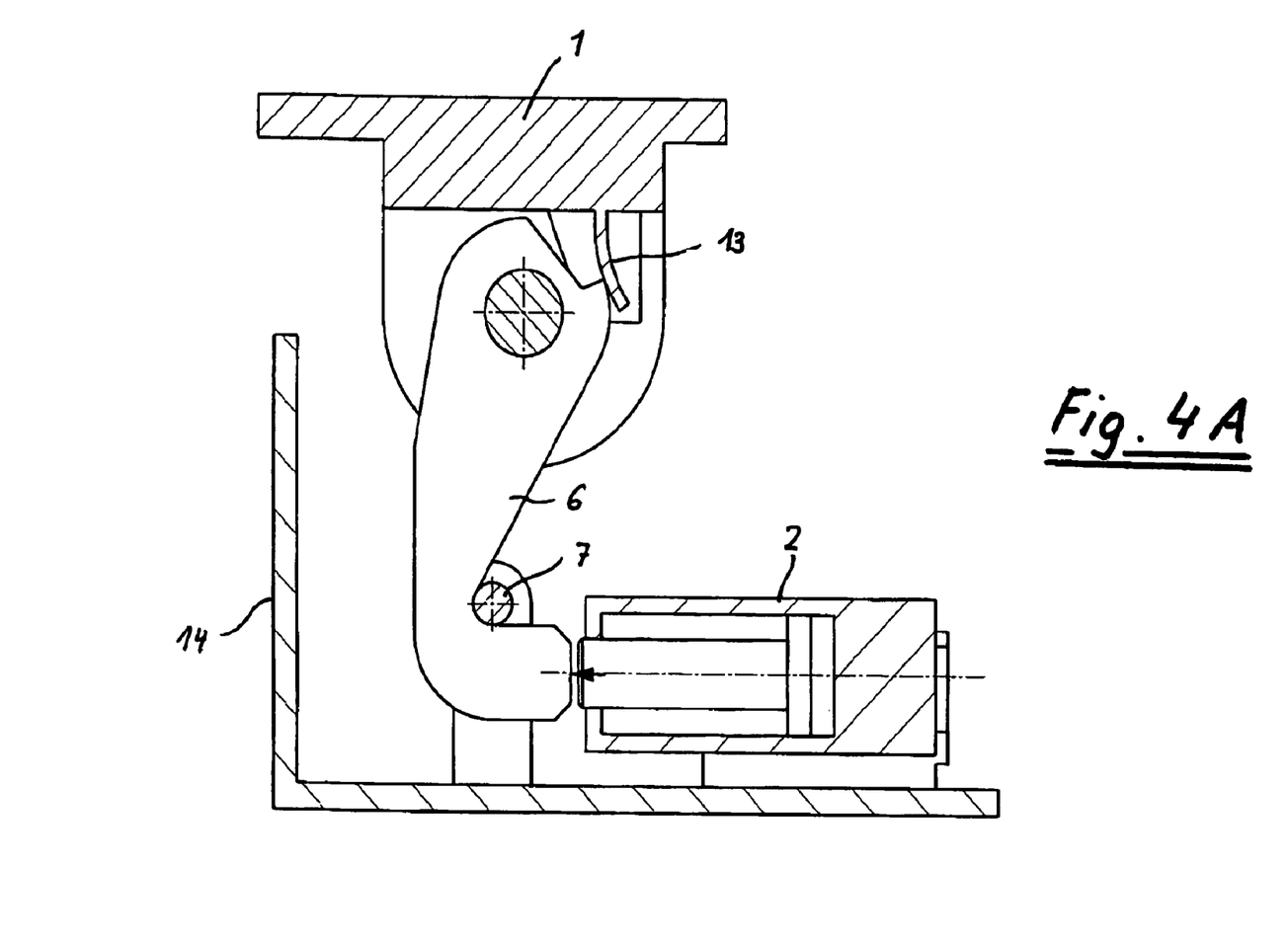
FIGS. 4A-4C a rebound stop by means of detent element in the region of the swivel mount.
Figure 4B:
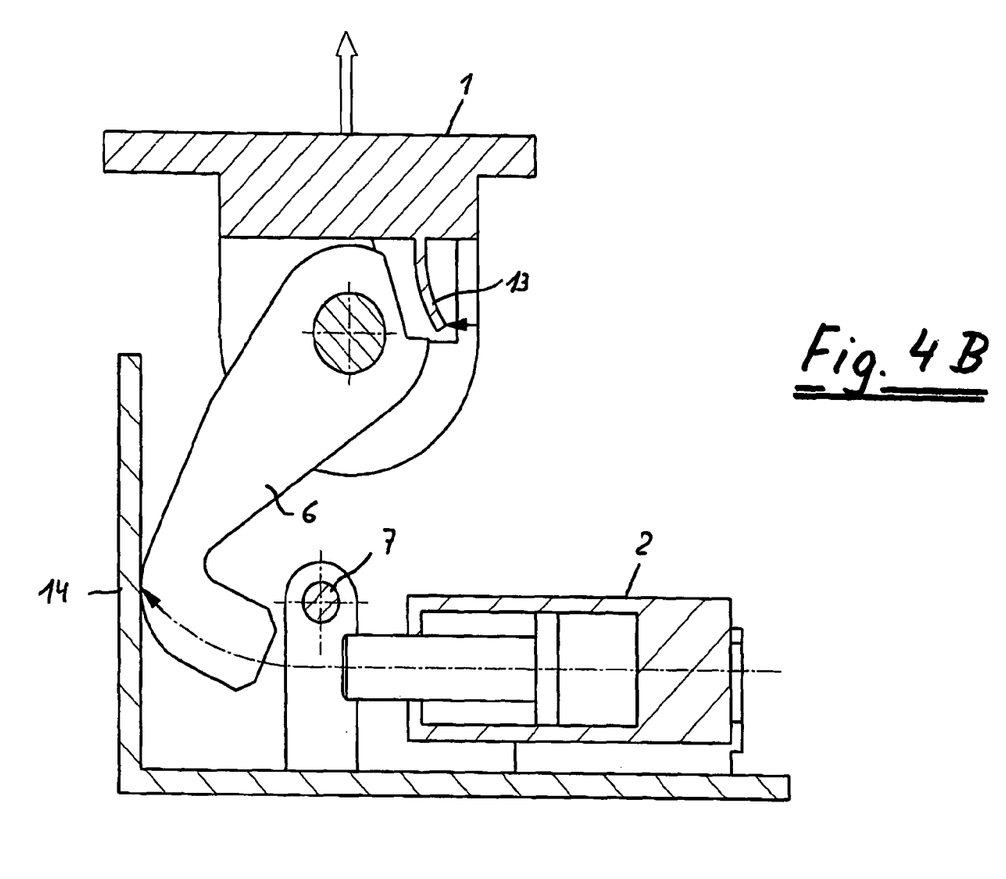
Figure 4C:
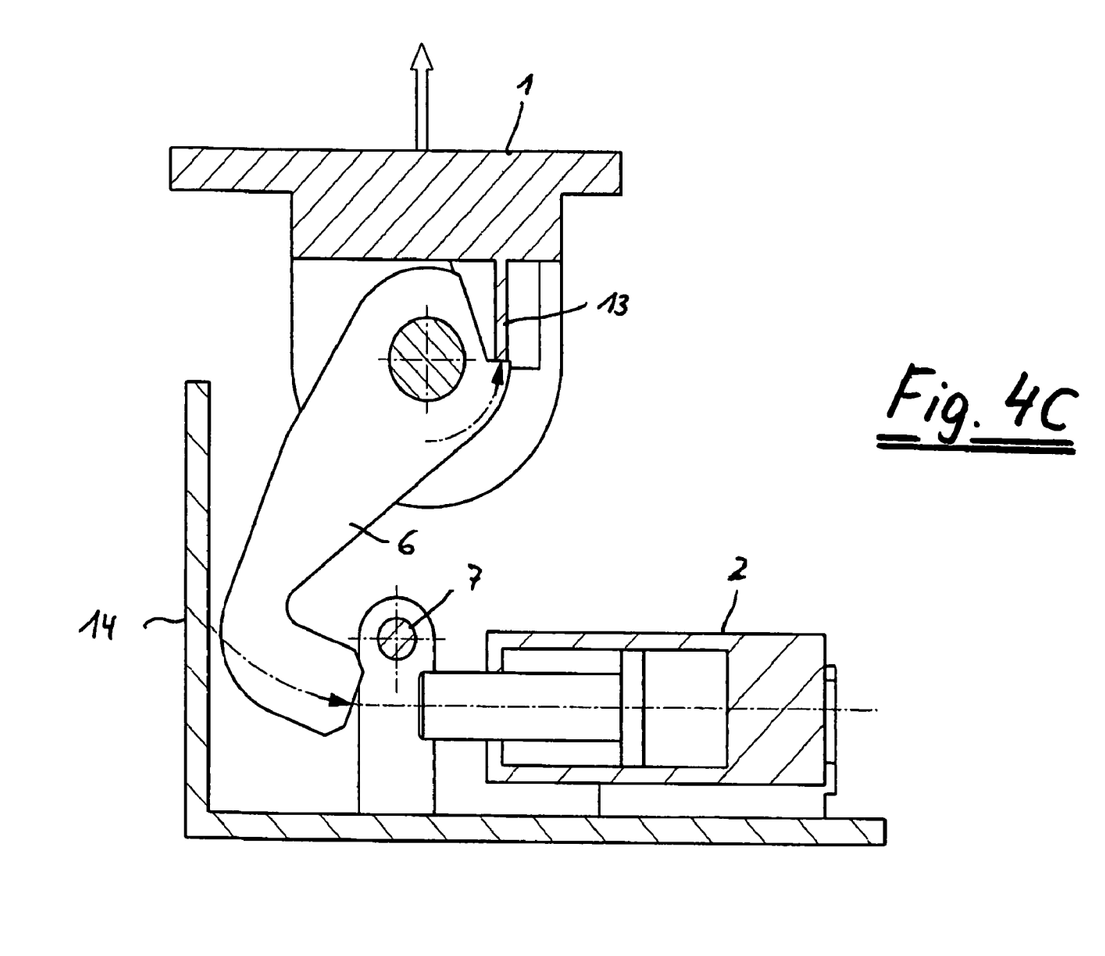

FIG. 4A shows yet another holding device with a catch element 6 swivel mounted on the roll bar 1, interacting with a bolt 7 or the like arranged fixed on the vehicle. Upon ignition of the pyrotechnical actuator 2, the catch element 6 is accelerated abruptly against the vehicle-fixed structural part 14, while at the same time it runs over an elastic detent element 13 provided in the region of the swivel mount, see FIG. 4B. This element then snaps back to the position shown in FIG. 4C and thus prevents the catch element 6 from swiveling back to the starting position.

The notion of the invention is not limited to the sample embodiments depicted. It is easily apparent to the person versed in the art that there are many possibilities for mitigating or preventing a harmful rebound effect. Whenever the path of the abruptly released catch element—for whatever reason—is limited and there is a danger of return of the catch element to the starting position due to a rebound effect, this danger can be eliminated according to the invention.

Moreover, the rebound safety can be designed—say, according to FIGS. 3A and 4A—so that the roll bar after a triggering of the rollover protection system and a return movement to the position of rest can no longer be fixed. The pyrotechnical actuator is consumed in the triggering and has to be replaced at the repair shop. If it were possible to fix the roll bar in the position of rest, the driver might think that the rollover protection system can be automatically activated once again.

What is claimed is:

1. A rollover protection system for motor vehicles comprising: a roll bar, which can be moved by a drive unit from a position of rest to a protection position, is secured in the protection position by a locking device and prevented from retracting, and is fixed in the position of rest by a holding device, wherein the holding device has a movably arranged catch element which can be disengaged abruptly by a pyrotechnic actuator that is present in the system, wherein the catch element can move beyond a release point and a structural part is provided that prevents a return movement of the catch element to the rest position.

2. The rollover protection system according to claim 1, wherein the structural part is a stopping face arranged at a slant to the direction of movement.

3. The rollover protection system according to claim 1, wherein a travel path of the catch element is limited by a stop and plastically deformable material is arranged either on the stop or on the catch element in an area of the point of impact.

4. The rollover protection system according to claim 1, wherein a travel path of the catch element is limited by a stop and a detent mechanism that is elastically deformable by the catch element is arranged in a travel path.

5. The rollover protection system according to claim 4, wherein the detent mechanism consists of two detent hooks, arranged relative to each other in branchlike fashion and able to be spread apart by the catch element.

6. The rollover protection system according to claim 4, wherein the detent mechanism consists of a detent spring arranged in the travel path of the catch element.

7. The rollover protection system according to claim 1, wherein the catch element consists of a swivel mounted pawl and a detent element is arranged in a region of a swivel mounting.

8. A rollover protection system for motor vehicles comprising: a roll bar, which can be moved by a drive unit from a position of rest to a protection position, is secured in the protection position by a locking device and prevented from retracting, and is fixed in the position of rest by a holding device, wherein the holding device has a movably arranged catch element which can be disengaged abruptly by a pyrotechnic actuator that is present in the system, wherein the catch element can move beyond a release point and a structural part is provided that prevents a return movement of the catch element to the rest position, and wherein a travel path of the catch element is limited by a stop and a detent mechanism that is elastically deformable by the catch element is arranged in a travel path.

9. The rollover protection system according to claim 8, wherein the detent mechanism consists of two detent hooks, arranged relative to each other in branchlike fashion and able to be spread apart by the catch element.

10. The rollover protection system according to claim 8, wherein the detent mechanism consists of a detent spring arranged in the travel path of the catch element.

* * * * *